(No Model.)
C. P. GROUT.
APPLYING ARTIFICIAL TOOTH CROWNS.
No. 336,231. Patented Feb. 16, 1886.
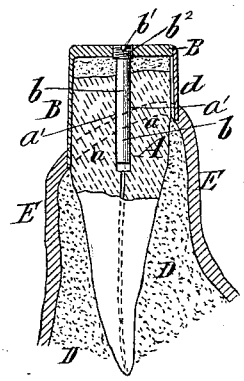
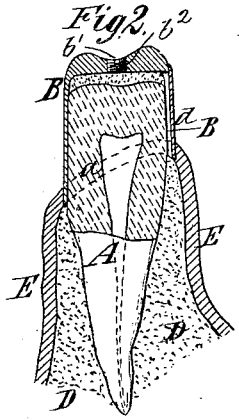
Witnesses:
Inventor:

UNITED STATES PATENT OFFICE.

CHARLES P. GROUT, OF NEW YORK, N. Y.

APPLYING ARTIFICIAL TOOTH-CROWNS.

SPECIFICATION forming part of Letters Patent No. 336,231, dated February 16, 1886.

Application filed September 1, 1885. Serial No. 175,926. (No model.)

*To all whom it may concern:*

Be it known that I, CHARLES P. GROUT, of the city and county of New York, in the State of New York, have invented a new and useful Improvement in the Method of Applying Artificial Tooth-Crowns, of which the following is a specification.

My invention relates to that system of dentistry which involves trimming off or shaping tooth roots or stumps, and the application thereto of artificial tooth-crowns, each consisting of a band portion, which fits the trimmed exterior of the tooth root or stump, and a closed top which forms the occluding surface. Such tooth-crowns have sometimes been provided with inwardly-projecting pins, which are rigidly fixed in their closed tops, and which enter holes or sockets, formed by enlarging the nerve-cavities or otherwise, in the tooth roots or stumps to which the crowns are to be applied. According to the method of applying such tooth-crowns heretofore practiced, the crowns are partly filled with a quick-setting cement, and are placed upon the tooth roots or stumps, and pressed down thereon to bring their lower edges below the free margin of the gum and nearly or near to the alveolar border. It is necessary that enough cement should always be placed in the crown to completely fill the space which is not occupied by the tooth root or stump, and hence such a quantity of cement is commonly placed in the crown that when the crown is pressed down to its place the cement will exude below the gum, thereby insuring a complete filling of all the space within the crown. When a number of crowns are combined together, so as to form a portion of a bridge, the cement has all to be placed in them at the same time, and the pressing down of the crowns upon the tooth roots or stumps must be done at once, and forcibly, before the cement shall have time to harden. When this is done, particularly with a number of crowns which are placed in position at one time, it causes great pain to the patient; and the object of my invention is to avoid such pain and annoyance to the patient, so far as is possible, and to enable the setting and fixing of the crowns in place to be done more deliberately, and consequently with greater exactness and precision.

In carrying out my invention, I form in the top or upper portion of the crown a small hole or opening, and I place the crown or crowns in position upon the tooth root or roots without any cement in them whatever, and afterward inject into them through the holes in their tops, by means of a small syringe, while still in position on the root or roots, such a quantity of soft cement as is necessary to fill them, and afterward plug up or close the holes or openings in their tops. This filling of the crowns may be done one only at a time, and after the crown or the connected crowns are properly placed in position upon the tooth root or roots, and consequently ample time is afforded for properly placing the crown or crowns before the cement is introduced into them. By injecting the cement through the holes or openings in the top of the crowns I am also enabled to completely fill them and cause little or no cement to exude from the crowns below the gum, and even if the free acid coming in contact with the gum of the patient does cause pain, it is very much less than when a number of crowns are filled with cement and then forced down upon the tooth roots or stumps, bringing the cement into contact with all the raw and sensitive surface of the gum at one and the same time.

As above stated, the cement may be injected into the crowns one by one, and afterward they may be plugged up, either by means of a simple screw-plug, which serves only to close the hole or opening, the latter being threaded to receive it, or by means of a long pin which has an enlarged screw-threaded head fitting the hole in the crown, and is adapted to project downward into the hole or socket in the tooth root or stump.

The invention will be hereinafter more fully described in detail, and pointed out in the claims.

In the accompanying drawings, Figure 1 is a sectional elevation of a tooth root or stump having a crown secured upon it according to my invention, and showing also a sectional view of the alveolar process or jawbone and the gum tissue; and Fig. 2 is a similar section showing a crown as closed by a simple plug which does not project at all into the root or stump.

Similar letters of reference designate corresponding parts in both figures.

A designates the tooth root or stump; B, the cap or crown which is applied thereto. D designates the alveolar process or jawbone, and E designates the gum tissue, which closes around the tooth above the alveolar border, (here designated by the dotted line $a$.) The crown B may be of the form ordinarily employed—that is, consisting of a band portion continuous around the circumference of the root or stump and closed at the top; or such band portion may be split or divided longitudinally and have its abutting edges secured by a key or clamp, $d$, slipped thereon, as is fully set forth in my application for Letters Patent, Serial No. 164,401, filed May 4, 1885.

The construction of the band with a longitudinal division or split, and with a clamp or key, $d$, whereby its abutting edges are secured together, provides for readily removing the crown from the root or stump, should it be desired for any purpose, and is fully described in my aforesaid application, but is not claimed as a part of my present invention.

In order to prepare them to receive the artificial crowns, the tooth roots or stumps A are trimmed or shaped externally by means of suitable tools, and they may have formed within them a socket or cavity, $a'$, which may be formed by drilling down and enlarging the nerve-cavity of the tooth, and is adapted to receive a pin, $b$, fixed in the crown B, and projecting downward into said hole or socket.

In the form of my invention shown in Fig. 1 the crown is partially secured by the pin $b$, which has its head $b'$ somewhat enlarged and externally screw-threaded, and the closed top of the crown has formed in it a hole, $b^2$, which is internally screw-threaded, and in which the head $b'$ of the pin is snugly fixed in position.

In the form of my invention shown in Fig. 2 there is no pin employed in securing the crown in place; but the screw-threaded hole $b^2$ in the top of the crown is closed after the cement is injected by means of the screw-plug $b'$. In both cases the top surface of the crown forms an occluding surface for the opposite teeth to bite against.

In carrying out my invention, I do not place any cement in the crowns B preparatory to placing them on the tooth roots or stumps A; but I place the crowns in position on such tooth roots or stumps while they are empty, and am therefore enabled to take as much time as may be necessary to place them properly in position with their lower edges pressed down to or nearly to the alveolar border $a$, and then inject through the hole $b^2$ in the top of the crown, and by means of a small syringe, such a quantity of suitable soft cement as may be necessary to completely fill the entire space within the crown which is not occupied by the tooth root or stump, and after this is done I insert in place a pin, $b$, (shown in Fig. 1,) or a plug, $b'$, (shown in Fig. 2,) the threaded head of the pin or plug being tightly screwed into the threaded hole provided for it in the top of the crown.

When a number of crowns combined together so as to form a bridge are secured in place according to my invention, I fill the crowns one after another with cement by injecting it into them, and hence am afforded as much time as may be necessary to carefully fill them, and I avoid any of the haste and rapid work which is absolutely necessary where a number of crowns are first partly filled with cement and then pressed down into place at one operation on the tooth roots or stumps which are to receive them.

By the term "cement," as herein used, I mean to include gutta-percha and all other cements, amalgams, and materials which may be made by heat or otherwise sufficiently plastic for use, as herein described.

In lieu of closing the hole $b^2$ by a plug screwed thereinto, the hole may be closed by filling with gold or other metal or alloy, or it may be filled with the cement or substance employed to fill the crown.

When it is undesirable or inconvenient for any reason to have the hole or opening $b^2$ in the top of the crown, it may be formed in the side thereof near the top.

I am aware of Patent No. 238,334, granted March 1, 1881, to William G. A. Bonwill, and I do not claim as of my invention anything described therein. That patent shows and describes an artificial crown secured by a pin to the tooth root or stump, both the crown and the root or stump having cavities which receive the pin and contain soft amalgam in which the pin is embedded. According to the method of applying crowns described in that patent, the pin is first set with amalgam in the tooth root or stump, and the crown is then placed temporarily thereon to ascertain if the pin be in proper position. The crown is then removed, and after filling its cavity with amalgam is pressed down firmly into place on the root or stump.

My method differs essentially from that above described as old, in that after placing the empty crown on the root or stump I do not again remove it therefrom, but while still in place on the root or stump I inject into it, through the hole in its top, a cement or amalgam.

What I claim as my invention, and desire to secure by Letters Patent, is—

1. The improvement in the method of applying artificial tooth-crowns, consisting in constructing the crown with a hole or opening in its upper portion, in then placing the empty crown in position on the tooth root or stump, and in injecting into the crown through the said hole or opening, and while it is on the root or stump, a quantity of cement sufficient to fill it, substantially as herein described.

2. The improvement in the method of applying tooth-crowns, consisting in preparing the tooth root or stump with an inwardly-extending hole or cavity, in constructing the tooth-crown with a screw-threaded hole, $b^2$, in its top, in then placing the empty crown in position on the tooth root or stump, and injecting through the said hole a sufficient quantity of cement to fill the crown, and in finally inserting a pin through the hole in the crown and downward into the hole or socket in the tooth-root, and tightly screwing such pin into the threaded hole in the top of the crown, substantially as herein described.

CHAS. P. GROUT.

Witnesses:
C. HALL,
FREDK. HAYNES.